July 8, 1941.   J. H. FOX ET AL   2,248,702
LAMINATED WOOD-GLASS PRODUCT
Filed June 7, 1938
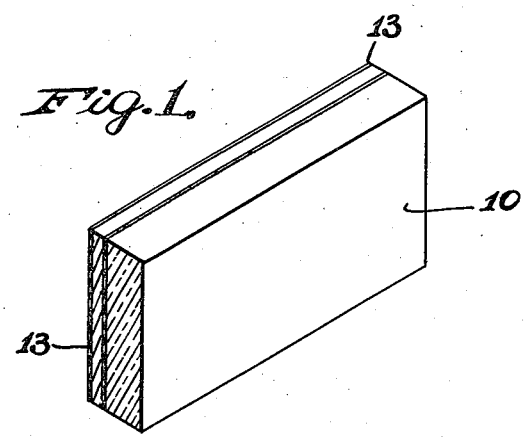
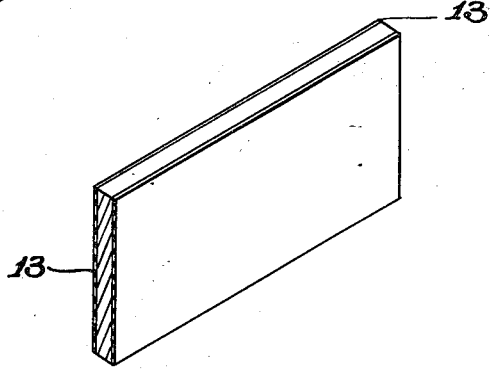
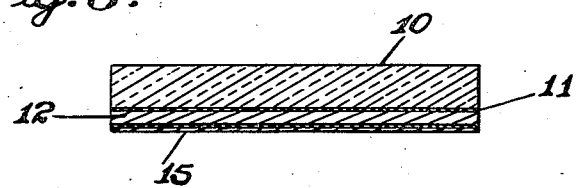
INVENTORS
JOHN H. FOX,
ROBERT A. MILLER AND
WILLIAM O. LYTLE
BY Bradley & Bee
ATTORNEYS.

Patented July 8, 1941

2,248,702

UNITED STATES PATENT OFFICE 2,248,702

LAMINATED WOOD-GLASS PRODUCT

John H. Fox, Pittsburgh, Robert A. Miller, Tarentum, and William O. Lytle, New Kensington, Pa., assignors to Pittsburgh Plate Glass Company, a corporation of Pennsylvania Application June 7, 1938, Serial No. 212,262

1 Claim. (Cl. 20—91)

The present invention relates to laminated glass and more particularly to a sandwich of wood-glass veneer.

The primary object of our invention is to provide a decorative laminated product which comprises a base of wood secured to a covering glass plate by means of an interposed sheet of transparent resin or other transparent adhesive.

These and other objects will be apparent from consideration of the following specification and claim in conjunction with the accompanying drawing, wherein:

Figure 1 is an isometric view of a modification of our invention;

Figure 2 is a similar view of a sheet of wood coated with a transparent adhesive composition; and Figure 3 is a cross-sectional view of a modification of our invention.

Briefly described, our invention comprises a sheet of natural wood secured to a covering glass plate by means of an interposed sheet of transparent adhesive material. The back surface of the sheet of wood may be protected by means of a covering sheet of metal foil, or other waterproof material.

Referring to Figures 1 and 2, forms of our invention are shown in which a sheet of wood is treated with a layer of resinous material, such as a coating of suitable transparent adhesive composition. Such a composition may be produced by mixing together about 10 per cent, by weight, of vinyl acetal resin with about 88 per cent, by weight, of a solvent for the resin, such as equal parts of butyl acetate and toluene, and about 2 per cent, by weight, of a plasticizer for the resin, such as diethylene glycol dihexoate. The composition may be applied in any suitable manner, as by brushing or spraying it on a sheet 13 of wood, shown in Figure 2, or the sheet may be immersed in the adhesive composition where a thick coating on both of its surfaces is desired. The coated sheet may then be secured to a glass sheet 10, as shown in Figure 1, by the application of heat and pressure. For example, the glass plate, resin and wood can be bonded together by subjecting the assembly to a pressure of from 50 to 100 pounds per square inch at a temperature of from 180° F. to 225° F. After cooling, the laminated plate may be used in any desired manner.

Referring to Figure 3, a modification of our invention is shown, which is similar to Figure 1, except that the rear surface of the sheet of wood is protected by securing thereto a thin coating 15 of metal foil or other waterproof material. The coating may be of any desired metal, such as aluminum, tin, or copper and it is adhered to the rear surface of the sheet 12 by means of a layer of resinous material, such as the kind of adhesive composition described above in connection with Figure 2. The glass sheet, resin, wood and metal foil may be united by the application of heat and pressure thereto as described above in connection with the product shown in Figure 1.

It will, of course, be understood that either soft or hard wood may be made an element of the disclosed assembly. Heretofore, only hard woods have been truly applicable to the preparation of veneers for they alone are durable enough to resist marring. Where, however, as in the present instance, the wood is covered by a sheet of glass it is protected and accordingly advantage may be taken of the beautiful grain and surface configuration of the softer woods. Furthermore, the selected wood does not need to be processed to surface perfection. When it is laminated to a glass sheet under heat and pressure, the wood, viewed through the glass, appears as though it had a highly finished surface and creates an impression that a glass plate had merely been superposed upon an even highly polished wood base.

The bonding or adhesive material used will have an index of refraction corresponding approximately to the index of refraction of the glass plate, and therefore, there will be only a negligible amount of light reflection from the second or lower surface of the glass plate, the light rays being absorbed at the surface of the wood. This property reduces greatly the annoyance sometimes caused by the double reflection of light from the surfaces of polished glass.

The amount of plasticizer present in the resin sheet or in the adhesive composition may vary within rather wide limits. For example, if the amount of plasticizer is increased, a soft resin is produced and this decreases the amount of heat and pressure required for the subsequent operation, wherein the glass sheet, resin, and wood are united into a composite plate. The use of low temperature and pressure conditions in the laminating operation are desirable since there is less possibility of damaging the sheet of wood during the molding.

It will be readily apparent that the present invention is applicable not only to plane surfaces but also to curved shapes, more suitable for special installations. In the latter case, the glass is bent to the desired form and it is a simple matter to bend the wood to the same shape. The glass, resin and wood layers are then assembled and subjected to heat and pressure to complete the laminating operation.

What we claim is:

In a laminated unit, a plate of wood having a plate of glass on one side thereof and a metallic plate on the other side thereof, a layer of transparent adhesive resin between the wood and glass plates, to secure the latter together in rigid relation, and a layer of adhesive resin between the wood and metallic plates to secure the latter plates together in rigid relation.

JOHN H. FOX.
ROBERT A. MILLER.
WILLIAM O. LYTLE.